United States Patent
Kuperman et al.

(10) Patent No.: US 8,084,384 B2
(45) Date of Patent: *Dec. 27, 2011

(54) MAGNESIUM ALUMINOSILICATE CLAYS—SYNTHESIS AND CATALYSIS

(75) Inventors: Alexander E. Kuperman, Orinda, CA (US); Theodorus Maesen, Point Richmond, CA (US); Dennis Dykstra, Pinole, CA (US); Ibrahim J. Uckung, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 278 days.

This patent is subject to a terminal disclaimer.

(21) Appl. No.: 12/245,414

(22) Filed: Oct. 3, 2008

(65) Prior Publication Data
US 2010/0087313 A1    Apr. 8, 2010

(51) Int. Cl.
*B01J 21/16* (2006.01)
*C01B 33/26* (2006.01)
*C01B 33/40* (2006.01)

(52) U.S. Cl. ............ 502/80; 502/81; 502/84; 423/328.1; 423/329.1; 423/330.1; 423/331

(58) Field of Classification Search .................... 502/80, 502/81, 84; 423/328.1, 329.1, 330.1, 331
See application file for complete search history.

(56) References Cited

U.S. PATENT DOCUMENTS

| | | | |
|---|---|---|---|
| 3,959,118 A | 5/1976 | Granquist | |
| 4,499,319 A | 2/1985 | Ballantine et al. | |
| 5,023,221 A | 6/1991 | Occelli | |
| 5,160,032 A | 11/1992 | Holmgren et al. | |
| 6,187,710 B1 | 2/2001 | Vogels et al. | |
| 6,334,947 B1 * | 1/2002 | De Boer et al. | 208/111.25 |
| 6,451,200 B1 * | 9/2002 | Lussier et al. | 208/300 |
| 6,589,902 B1 * | 7/2003 | Stamires et al. | 502/80 |
| 6,930,067 B2 * | 8/2005 | O'Connor et al. | 502/64 |
| 2003/0027713 A1 * | 2/2003 | O'Connor et al. | 502/64 |
| 2003/0073567 A1 * | 4/2003 | Stamires et al. | 502/84 |
| 2007/0231249 A1 * | 10/2007 | Batllo et al. | 423/592.1 |

OTHER PUBLICATIONS

PCT/US2009/058944 filed Sep. 30, 2009, International Search Report, Mail Dated Apr. 30, 2010.

* cited by examiner

*Primary Examiner* — Elizabeth Wood
(74) *Attorney, Agent, or Firm* — Susan M. Abernathay; E. Joseph Gess; Michael D. Ross

(57) ABSTRACT

This invention is directed to a synthesis process for preparing magnesium aluminosilicate clays and to the products of said process. Briefly, a silicon component, an aluminum component, and a magnesium component are combined, under aqueous conditions and at an acidic pH, to form a first reaction mixture and subsequently the pH of the first reaction mixture is adjusted to greater than 7.5 to form a second reaction mixture. The second reaction mixture is allowed to react under conditions sufficient to form the magnesium aluminosilicate clay of the present invention. The invention is also directed to catalyst compositions comprising the magnesium aluminosilicate clays synthesized according to the process of the invention. The resulting magnesium aluminosilicate clay can be used as a catalyst or as a component in catalyst compositions. The invention is further directed to a magnesium aluminosilicate clay with a characteristic $^{29}$Si NMR spectrum and the use of said magnesium aluminosilicate clay in catalyst compositions.

29 Claims, No Drawings

MAGNESIUM ALUMINOSILICATE CLAYS—SYNTHESIS AND CATALYSIS

This application is related to two co-filed patent applications titled "Hydrodemetallization catalyst and process" and "Hydrocracking catalyst and process using a magnesium aluminosilicate clay," herein incorporated in their entirety.

FIELD OF THE INVENTION

This invention is directed to magnesium aluminosilicate clays, a synthesis process for making magnesium aluminosilicate clays, and the use of said magnesium aluminosilicate clays in hydroprocessing catalysts and reactions.

BACKGROUND OF THE INVENTION

Layered magnesium aluminosilicates can be described as a type of clay comprising alternating layers of octahedrally co-ordinated magnesium atoms and tetrahedrally co-ordinated silicon and/or aluminum atoms. Magnesium aluminosilicate clays have a negative layer charge which can be balanced by cations. Among other characteristics, the type of charge balancing cations imparts catalytic activity to the magnesium aluminosilicate clays. The literature contains examples of magnesium aluminosilicate clays, methods of making magnesium aluminosilicate clays, and catalyst compositions comprising magnesium aluminosilicate clays.

The literature describes the synthesis of clay minerals under hydrothermal conditions. Such hydrothermal synthesis can involve a long hydrothermal treatment at relatively high temperatures and pressures. The application of this technology on an industrial scale can be difficult and costly due to the reaction conditions employed.

Other known methods for producing clay materials such as metallo-aluminosilicates involve the formation of a silica-alumina gel prior to addition of the metallo component. For a review of silica-alumina gel synthetic methods for preparing metallo-aluminosilicates and other clay materials see, for example, R J M J Vogels, J T Kloprogge, and J W Geus, Amer. Mineral. (2004), "Synthesis, characterization of saponite clays", 931-944. Yields of products produced via a silica-alumina gel can be better than in the hydrothermal synthetic route, but are generally not quantitative. In addition, formation of a silica-alumina gel requires an added step in the synthesis of the clay material.

While synthesis of clays can be difficult, particularly on a large scale, clays have received attention for use in catalytic processes such as cracking or as catalyst components in hydroprocessing reactions. For example, U.S. Pat. No. 3,844,978 discloses a layer-type, dioctahedral, clay-like mineral useful in catalytic processes. U.S. Pat. No. 3,844,979 discloses a layer-type trioctahedral, clay-like mineral that is a magnesium aluminosilicate, catalyst composition comprising said magnesium aluminosilicate, and hydroprocesses for using said magnesium aluminosilicate.

U.S. Pat. No. 3,887,454 discloses hydroconversion processes using a layer-type, dioctahedral, clay-like mineral that is a magnesium aluminosilicate. Catalyst compositions and hydroprocessing reactions using catalyst compositions comprising magnesium aluminosilicates and hydrogenation components such as Group VIII metals are also disclosed.

U.S. Pat. No. 6,187,710 and U.S. Pat. No. 6,565,643 disclose synthetic swelling clay minerals, methods of making swelling clay minerals, and the use of said swelling clay minerals as hydrocarbon reaction catalysts. U.S. Pat. No. 6,334,947 discloses catalysts compositions comprising a swelling clay and the use of said catalyst compositions in hydroprocessing reactions. Magnesium aluminosilicates are examples of swelling clays disclosed in U.S. Pat. No. 6,187,710, U.S. Pat. No. 6,565,643, and U.S. Pat. No. 6,334,947.

There still exists a need for improved methods of synthesizing magnesium aluminosilicate clays and for magnesium aluminosilicate clays with improved characteristics that can be used as catalysts or components of catalyst compositions in hydroprocessing and other applications.

SUMMARY OF THE INVENTION

This application discloses a synthesis process for preparing a magnesium aluminosilicate clay comprising the following steps:
  a) combining (1) a silicon component, (2) an aluminum component, and (3) a magnesium component, under aqueous conditions at a first reaction temperature and at ambient pressure, to form a first reaction mixture, wherein the pH of said first reaction mixture is acidic;
  b) adding an alkali base to the first reaction mixture to form a second reaction mixture wherein the pH of the second reaction mixture is greater than the pH of the first reaction mixture;
  c) reacting the second reaction mixture at a second reaction temperature and for a time sufficient to form a product comprising a magnesium aluminosilicate clay.

In one embodiment, the pH of the first reaction mixture is between 0 and 5. In one embodiment the pH of the second reaction mixture is at least 7.5. In another embodiment, the pH of the second reaction mixture is at least 8. In another aspect, the invention is also directed to the product of the above described process.

Another aspect of the invention is directed to a magnesium aluminosilicate clay wherein the magnesium aluminosilicate clay has a silicon to aluminum elemental mole ratio greater than 3 and wherein the $^{29}$Si NMR of the magnesium aluminosilicate clay comprises peaks as given in Table 1:

TABLE 1

| Peaks | Chemical shift (ppm)[1] |
| --- | --- |
| P1 | −79 |
| P2 | −82 |
| P3 | −85 |
| P4 | −88 |
| P5 | −93 |

[1] +/−3 ppm

The present invention is further directed to catalyst compositions comprising the magnesium aluminosilicate clay.

Hydroprocessing processes using the magnesium aluminosilicate clay also form part of this invention.

DETAILED DESCRIPTION OF THE INVENTION

An aspect of the invention provides a process for making magnesium aluminosilicate clays. This process improves upon prior art methods for synthesizing magnesium aluminosilicate clays. One prior art method of synthesizing magnesium aluminosilicate clays involves the formation of a silica-alumina gel prior to addition of the magnesium component. Another prior art method of synthesizing magnesium aluminosilicate clays involves hydrothermal synthesis at elevated temperatures and pressures. In the process of the invention, a silica-alumina gel is not formed prior to addition of the magnesium component nor is the reaction carried out under hydrothermal conditions. Thus, the invention provides a more facile synthesis of magnesium aluminosilicate clays. In the magnesium aluminosilicate clay synthesis process of the invention, the yield of magnesium aluminosilicate clay can be essentially quantitative, providing an economic benefit of ease of reaction and high yield.

DEFINITIONS

While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

The following terms will be used throughout the specification and will have the following meanings unless otherwise indicated.

As used herein, "hydroprocessing" is meant any process that is carried out in the presence of hydrogen, including, but not limited to, methanation, water gas shift reactions, hydrogenation, hydrotreating, hydrodesulphurization, hydrodenitrogenation, hydrodemetallation, hydrodearomatization, hydroisomerization, hydrodewaxing and hydrocracking including selective hydrocracking. Depending on the type of hydroprocessing and the reaction conditions, the products of hydroprocessing may show improved viscosities, viscosity indices, saturates content, low temperature properties, volatilities and depolarization, for example.

As used herein "hydrothermal" refers to reactions performed in the presence of water or steam at temperatures above 100° C. and at pressures above atmospheric pressures (i.e. above about 1.2 bar).

As used herein "hydrocarbon" refers to any compound which comprises hydrogen and carbon, and "hydrocarbon feedstock" refers to any charge stock which contains greater than about 90 weight percent carbon and hydrogen.

As used herein "Group VIB" or "Group VIB metal" refers to one or more metals, or compounds thereof, selected from Group VIB of the CAS Periodic Table.

As used herein "Group VIII" or "Group VIII metal" refers to one or more metals, or compounds thereof, selected from Group VIII of the CAS Periodic Table.

As used herein "alkali base" refers to a basic ionic salt comprising an alkali metal or an alkaline earth metal. Examples include sodium hydroxide and potassium hydroxide.

As used herein "cracking" refers to the breaking of larger carbon containing molecules into smaller ones. Cracking can refer to hydrocracking wherein the cracking takes place in the presence of an elevated partial pressure of hydrogen gas. Cracking also refers to catalytic cracking wherein the cracking takes place in the presence of acid catalysts.

As used herein "aqueous mixture" refers to a combination of one or more components in the presence of water. The components can be soluble, somewhat soluble, or insoluble. The aqueous mixture can be homogeneous or heterogeneous.

The term "mesoporous" refers to an average pore size of about 2 to 50 nm as described in IUPAC Appendix to the *Manual of Symbols and Terminology for Physicochemical Quantities and Units* (Butterworths: 1970 and *Pure and Applied Chemistry*, 1970, 21, No. 1)

The term "ambient pressure" refers to pressures in the range of about 0.9 bar to about 1.2 bar.

The BET surface area is determined by adsorption of nitrogen at 77K and mesopore surface area by the BJH method (described in E. P. Barrett, L. C. Joyner and P. H. Halenda, J. Amer. Chem. Soc., 73, 1951, 373.). The micropore volume is determined by the DR equation (as described in Dubinin, M. M. Zaverina, E. D. and Raduskevich, L. V. Zh. Fiz. Khimii, 1351-1362, 1947). The total pore volume is determined from the nitrogen adsorption data, the mesopore volume is determined by the difference between total pore volume and the micropore volume.

The $^{29}$Si NMR spectra were collected at a spinning speed of 8 kHz with at least 500 scans and a relaxation time of 100 seconds between scans.

Silicon to aluminum elemental mole ratios of magnesium aluminosilicate clays can be determined from the $^{29}$Si NMR based on peak intensities. See, for example, G. Engelhardt and D. Michel (1987), *High-Resolution Solid-State NMR of silicates and Zeolites*. New York: John Wiley & Sons, in particular pages 180-187.

In an embodiment, the invention comprises forming an aqueous mixture of a silicon component, an aluminum component, and a magnesium component under acidic conditions to form a first reaction mixture. As used herein "component" refers to any material, salt, and/or compound comprising a given element which can act as a source of said element. For example "silicon component" can refer to silicon in the elemental form, silicon containing compounds, and/or silicon salts which can be used as a source of silicon. Examples of silicon components useful in the process of the invention include, but are not limited to, sodium silicate, potassium silicate, silica gels, silica sols, and combinations thereof. In one embodiment of the process of the invention, the silicon component is sodium silicate. Examples of aluminum components aluminum useful in the process of the invention include, but are not limited to, sodium aluminate, potassium aluminate, aluminum sulfate, aluminum nitrate, and combinations thereof. In one embodiment of the invention, the aluminum source is aluminum nitrate. Examples of magnesium components useful in the process of the present invention include, but are not limited to, magnesium metal, magnesium hydroxide, magnesium halides, magnesium sulfate, and magnesium nitrate. In one embodiment of the invention the magnesium component is magnesium nitrate.

In the first reaction mixture, the ratio of silicon to aluminum to magnesium, can be expressed in terms of elemental mole ratios as:

$$a\text{Si}:b\text{Al}:c\text{Mg}$$

wherein "a" has a value from 6 to 8, "b" has a value from 0.001 to 7.9, and "c" has a value of from 0.1 to 6, wherein b=(6−c)+(8−a), and wherein a:b is at least 3.

The silicon, aluminum, and magnesium components are combined, under aqueous conditions, to form a first reaction mixture wherein the first reaction mixture has an acidic pH. In one aspect the pH of the first reaction mixture is in the range of between about 0 to about 5. The pH of the first reaction mixture can be adjusted by the addition of an acid in order to achieve a pH of between about 0 to about 5. Examples of acids include, but are not limited to, mineral acids such as sulfuric acid, hydrochloric acid, and nitric acid. Organic acids such as acetic acid, citric acid, formic acid, and oxalic acid can also be used.

The first reaction mixture is generally formed under ambient pressure and temperature conditions. Pressures ranges for the reaction are between about 0.9 bar and 1.2 bar, preferably between about 1.0 bar and about 1.1 bar. The temperature for the formation of the first reaction mixture is not critical. The temperature can be between the freezing point and the boiling point of the first reaction mixture. Generally, the temperature is between about 0° C. and 100° C. and preferably at least 50° C.

After addition of the silicon, aluminum, and magnesium components and adjustment of the pH to an acidic range to form the first reaction mixture, an alkali base is added to form a second reaction mixture. Examples of alkali base include, but are not limited to, sodium hydroxide and potassium hydroxide. Sufficient alkali base is added to the first reaction mixture so as to ensure that the pH of the resulting second reaction mixture is at least 7.5.

The second reaction mixture is then reacted for sufficient time and at sufficient temperature to form the magnesium aluminosilicate clay of the invention. In embodiments, the time is at least one second, preferably at least 15 minutes, and most preferably at least 30 minutes. In some embodiments, precipitation of the magnesium aluminosilicate clay of the invention can be instantaneous. The temperature can be between the freezing point and the boiling point of the second reaction mixture. In embodiments, the temperature of the second reaction mixture can range from about 0° C. to about 100° C. In an embodiment, the temperature of the second reaction mixture is at least 50° C. Generally, higher temperatures result is shorter times to form the magnesium aluminosilicate clay. The reaction can be done at ambient pressure, although higher or lower pressures are not excluded. In the synthesis process described, the magnesium aluminosilicate clay is formed in the second reaction mixture step. In embodiments, the magnesium aluminosilicate clay of the invention quantitatively precipitates from the second reaction mixture. The second reaction mixture, upon precipitation of the magnesium aluminosilicate clay comprises the solid magnesium aluminosilicate clay and a supernatant. By "supernatant" it is meant the aqueous portion of the reaction mixture that is in liquid form, essentially free of solid or particulate material. The magnesium aluminosilicate clay can be collected by, for example, filtration, evaporation of the supernatant, or centrifugation. The addition of an alkali base during the second step of the synthesis process will incorporate alkali cations into the magnesium aluminosilicate clay.

The magnesium aluminosilicate clay can then be washed, and/or dried, and/or ion exchanged, and/or calcined. In embodiments, the magnesium aluminosilicate clay is subjected to an ion exchange reaction with an ammonium salt solution, wherein at least a portion of the alkali in the product is exchanged for ammonium cations. The magnesium aluminosilicate clay need not be isolated from the second reaction mixture before ion exchange. For example, an ammonium salt in solid or solution form can be directly added to the second reaction mixture after the precipitation of the magnesium aluminosilicate clay. Examples of ammonium salts include, but are not limited to, ammonium nitrate, ammonium bicarbonate, and ammonium chloride. Generally, the ammonium cations will have the formula $[NH_xR_y]^+$, where R is any alkyl or other organic radical group, $x=1-4$, $y=0-4$, and $x+y=4$. In a preferred embodiment, the ammonium cations are $NH_4^+$ cations. After ion exchange the magnesium aluminosilicate product can then be separated from the supernatant by filtration, centrifugation, or any other methods known in the art. The product can then be dried and/or calcined.

The supernatant from the ion exchange step can be collected for use in other applications. For example, if nitric acid was used during synthesis and the ion exchange reaction used ammonium cations, the effluent will be rich in ammonium nitrate. After isolation of the magnesium aluminosilicate clay, the ammonium nitrate rich supernatant can be used as a fertilizer or as a component in a fertilizer. Because the precipitation of the magnesium aluminosilicate product can be essentially quantitative, the supernatant will have essentially no magnesium, silicon, or aluminum present. The presence of excess amounts of silicon and/or aluminum and/or magnesium would render the supernatant less useful as a fertilizer or fertilizer component. By using the supernatant as well as the magnesium aluminosilicate clay product, an economic benefit can be realized in that there is little waste of reagents or costly recycling of magnesium, silicon, and/or aluminum containing supernatant.

Before use as a catalyst or as a component in a catalyst, the magnesium aluminosilicate clay can be calcined. The magnesium aluminosilicate clay can be combined with other components before or after calcination. Calcination is generally performed at temperatures between about 450° C. to about 900° C. for a time ranging from about 1 hour to about 12 hours under an inert atmosphere. Calcination reaction times and temperatures are not critical. For example, if the magnesium aluminosilicate clay comprises ammonium cations, the calcination is generally performed at sufficient temperature and for sufficient time so as to deammoniate or remove other nitrogen containing compounds from the magnesium aluminosilicate clay, leaving protons as the charge compensating ions in the magnesium aluminosilicate clay. By deammoniate it is meant that ammonia is driven off, leaving protons as the charge compensating ions in the magnesium aluminosilicate clay. The calcination step is necessary to form a catalytically active material.

The product of the above described process is a magnesium aluminosilicate clay. The ratio of silicon to aluminum in the magnesium aluminosilicate clay is at least 3. The ratio of silicon to aluminum to magnesium of the magnesium aluminosilicate clay can be expressed in terms of elemental mole ratios:

$$dSi:eAl:fMg$$

wherein "d" has a value from 6 to 8, "e" has a value from 0.001 to 7.9, and "f" has a value of from 0.1 to 6, wherein $e=(6-f)+(8-d)$, and wherein d:e is at least 3.

In an aspect of the invention, the magnesium aluminosilicate clay is a layered material composed of elemental clay platelets. The size of the clay platelets of the magnesium aluminosilicate clay is dependent on the reacting temperature and the reacting time of the second reaction mixture. Generally, the higher the temperature and the longer the time, the larger the clay platelets will be. Depending of the desired size of the clay platelets in the product, reacting time and temperature can be varied accordingly. In one embodiment of the present invention the product comprises clay platelets with an average size of from about 5 nm to about 500 nm in the longest dimension. In another embodiment the product comprises clay platelets with an average size of from about 5 nm to about 50 nm in the longest dimension.

The degree of stacking of the clay platelets is dependent on the ionic strength of the second reaction mixture. A high ionic strength will give much-stacked structures, while a low ionic strength will lead to structures exhibiting little stacking. The ionic strength of the second reaction mixture can be adjusted by increasing or decreasing the concentration of reactants (silicon, aluminum, and magnesium components) and altering the pH. For example, a dilute solution with a pH about 8 will have a lower ionic strength than a solution with a high concentration of reactants and a pH higher than 8. In one embodiment, the clay platelets have a degree of stacking of between 1 to about 5, in another embodiment the clay platelets have a degree of stacking of between about 1 to about 3.

The lower limit is constituted by unstacked clay platelets, which have a "degree of stacking" of 1. The two parameters—the size of the clay platelets and the degree of stacking—can be estimated by means of transmission electron microscopy (TEM) and powder x-ray diffraction respectively. In an embodiment, the powder x-ray diffraction of the magnesium aluminosilicate clay of the invention has only broad peaks. Broad peaks are indicative of a low degree of stacking.

The individual clay platelets are composed of sheets of octahedrally coordinated metal ions interlinked by means of oxygen ions and sheets of tetrahedrally coordinated metal ions interlinked by oxygen ions. The apical oxygen atoms of the tetrahedral sheets help form the base of the octahedral sheets, thus connecting the sheets to one another. A regular assemblage of sheets (for example tetrahedral-octahedral or tetrahedral-octahedral-tetrahedral) is called a layer. If the sheet arrangement is tetrahedral-octahedral it is referred to as 1:1, if the sheet arrangement is tetrahedral-octahedral-tetrahedral it is referred to as 2:1. The product of the present invention can be described as a 2:1 layered magnesium aluminosilicate.

The catalytic activity of the magnesium aluminosilicate clay stems in part from the charge on the sheets. A neutral tetrahedral sheet requires that the tetrahedrally co-ordinated metal ion have a tetravalent charge. In general, the metal ion will be $Si^{4+}$. To have a neutral octahedral layer, the metal ions present in that layer will have to provide a total charge of 6+ for every three octahedral cavities. This can be achieved by filling two out of every three octahedral cavities with trivalent metal ions, such as $Al^{3+}$, or by filling all octahedral cavities of each set of three with divalent metal ions, such as $Mg^{2+}$. This gives two types of octahedral layers, trioctahedral layers, in which all octahedral sites are filled and dioctahedral layers, which have two thirds of the octahedral sites filled. We believe that the product of the present invention comprises a 2:1 trioctahedral magnesium aluminosilicate. For further description of clay classification see J. Theo Kloprogge, Sridhar Komarneni, and James E. Amonette, "Synthesis of smectite clay minerals; a critical review" *Clays and Clay Minerals*; October 1999; v. 47; no. 5; p. 529-554, herein incorporated by reference.

When lower valency cations are substituted or partially substituted for higher valency cations in the clay platelet structure, the clay platelet is negatively charged. For instance, in the tetrahedral layer trivalent metal ions, for example $Al^{+3}$, may be substituted for a portion of the tetravalent metal ions such as $Si^{+4}$. In the case of a clay with a trioctahedral layer structure, such as the product of the process of the present invention, such a substitution will give a saponite or a vermiculite. The divalent $Mg^{2+}$ metal ions in the octahedral layer can be substituted or partially substituted by monovalent metal ions such as $Na^+$, $K^+$, or $Li^+$.

In an embodiment of the invention, the magnesium aluminosilicate clay can have at least 0.1 atomic %, as compared with the neutral clay, of the silicon, aluminum, and/or magnesium cations replaced by cations of a lower valency. Preferably, at least 1 atomic %, more preferably at least 5 atomic %, of the silicon, aluminum, and/or magnesium cations in the clay platelets is replaced by cations of a lower valency. In the octahedral layer, preferably not more than 50 atomic % of the magnesium ions is replaced by ions of a lower valency as compared with the neutral situation, more preferably not more than 30 atomic % is replaced. In the case of the tetrahedral layer, preferably not more than 30 atomic % of the silicon ions present is replaced by ions of a lower valency, more preferably not more than 15 atomic %. Isomorphous substitution may occur only in the octahedral layer, only in the tetrahedral layer, or in both layers. In this context the term isomorphous substitution also refers to the removal of cations without the incorporation into the lattice of replacement cations, by which vacancies are produced. It will be clear that this removal also generates negative charges.

The neutral tetrahedral layer comprises $Si^{4+}$ ions. At least a portion of the $Si^{4+}$ ions can be substituted by trivalent ions to impart a negative charge on the layer. The trivalent ions in the tetrahedral layer preferably are aluminium ($Al^{3+}$) ions, although other trivalent ions such as chromium, cobalt (III), iron (III), manganese (III), titanium (III), gallium, vanadium, molybdenum, tungsten, indium, rhodium, and/or scandium can also be substituted. In an aspect of the invention, the magnesium aluminosilicate clay comprises at least 1 ppm $Al^{3+}$ ions. The neutral octahedral layer comprises divalent magnesium ($Mg^{2+}$) ions, although other divalent ions such as nickel, cobalt (II), iron (II), manganese (II), copper (II) and/or beryllium can also be incorporated into the neutral octahedral layer. The divalent ions of the neutral octahedral layer can be substituted by monovalent ions such as lithium ($Li^+$) ions to impart a negative charge on the octahedral layer.

The negative charge generated by isomorphous substitution is counterbalanced by the incorporation of cations, also known as counter-ions, into the space between the clay platelets. These counter-ions often are sodium or potassium. Generally, these cations are incorporated in the hydrated form, causing the clay to swell. For this reason, clays with negatively charged clay platelets are also known as swelling clays. It is because of the negative charge caused by isomorphous substitution that clays can be advantageous for use in catalysis, since it gives them the potential to function as solid acids. However, to be able to function as solid acids, it is essential that the clay minerals comprise protons, since these are at least partially responsible for the cracking ability of these compounds. Protons can be incorporated into the clay by replacing the non-hydrolyzable counter-ions such as sodium or potassium with ammonium ions and then heating the whole. This process will deammoniate the material, leaving a proton. Protons can also be introduced by replacing the counter-ions with hydrolyzable metal ions such as Mn(II) and Ca(II).

Generally, a hydrolysable metal ion ($M^{n+}$) may hydrolyze according to the following scheme, depending upon pH and concentration:

$$M^{n+} + xOH^- \longleftrightarrow M(OH)_x^{(n-x)+}, \tag{1}$$

$$M(OH)_x^{(n-x)+} + OH^- \longleftrightarrow M(OH)_{x+1}^{(n-x+1)+}, \tag{2}$$

$$M(OH)_x^{(n-x)+} + H^+ \longleftrightarrow M(OH)_{x-1}^{(n-x+1)+} + H_2O. \tag{3}$$

With equation (3) yielding a proton.

While not being bound by any theory, we believe that the magnesium aluminosilicate clays prepared by the synthesis process of the present invention exhibit greater substitution of $Al^{3+}$ in the tetrahedral layer than magnesium aluminosilicate clays prepared by initial formation of a silica-alumina gel. The high degree of substitution of $Al^{3+}$ for $Si^{4+}$ results in a more active magnesium aluminosilicate clay after ion exchange and calcination due to higher acidity of the magnesium aluminosilicate clay.

The magnesium aluminosilicate clay of the present invention can be characterized by surface area and pore characteristics. The magnesium aluminosilicate clay of the present invention generally has an average B.E.T. surface area in the range of 100 to 1000 m²/g and preferably in the range of 400 to 900 m²/g. The magnesium aluminosilicate clay has an average pore volume, determined by means of B.E.T. nitrogen adsorption, in the range of 0.3 to 2.0 cc/g, preferably in the range of at least 0.5 cc/g, and most preferably in the range of at least 0.9 cc/g. The magnesium aluminosilicate clay has an average pore size, determined by means of nitrogen adsorption/desorption in the mesoporous range. In embodiments, the magnesium aluminosilicate clay of the present invention is mesoporous with an average pore size of about 2 nm to about 50 nm.

In an embodiment, the magnesium aluminosilicate clay has a silicon to aluminum elemental mole ratio greater than 3. The $^{29}Si$ NMR of the magnesium aluminosilicate clay comprises peaks as given in Table 1.

In one embodiment, the magnesium aluminosilicate clay of the invention can be used as a catalyst or as a component in a catalytic composition. When used as a catalyst or as a component of a catalyst in the absence of added hydrogen, the magnesium aluminosilicate clay of the present invention can be used in catalysts for converting hydrocarbons to more valuable products by acid catalyzed reactions, such as catalytic cracking, isomerization of n-paraffins to isoparaffins, isomerization of alkyl aromatics, alkylation, transalkylation of alkyl aromatics, and dewaxing.

The magnesium aluminosilicate clay can be used alone or in combination with other components such as zeolites and/or inorganic oxides such as silica, alumina, silica-alumina, and the like. When used as a cracking catalyst or as a component in a cracking catalyst, the magnesium aluminosilicate product of the present invention is preferably in an acidic form. This refers to the replacement of non-acidic cations with protons to balance the negatively charged tetrahedral and/or negatively charged octahedral sheets. In order for the magnesium aluminosilicate of the present invention to be an active component of a cracking catalyst, the magnesium aluminosilicate must be in an acidic form.

The magnesium aluminosilicate clay of the invention can be used as a catalyst or catalyst component in the presence of hydrogen. For reactions in the presence of hydrogen the term "hydroprocessing" is used herein. Examples of hydroprocessing reactions include hydrotreating, hydrocracking, hydrodemetallization, hydroisomerization, hydrofinishing, hydrogenation of olefins, and hydrogenation of aromatics. The magnesium aluminosilicate clay of the invention can be used in a wide variety of hydroprocessing catalyst compositions. Hydroprocessing catalyst compositions can include additional components such as metals, zeolites, other clays, molecular sieves, inorganic oxides, binders, diluents, and combinations thereof. The following examples of hydroprocessing catalysts comprising the magnesium aluminosilicate clay described above are not intended to limit in any way the scope of the invention.

When used in a catalyst composition for hydroprocessing, the magnesium aluminosilicate clay of the invention can act as a support for at least one hydrogenation metal. As used herein "hydrogenation metal" refers to any metal or metal compound capable of lowering the energy of activation for a hydrogenation reaction. As used herein "active metal" and "catalytically active metal" refers to any metal or metal compound capable of lowering the energy of activation for a hydrogenation reaction and is used interchangeably with "hydrogenation metal." Examples of hydrogenation metals include, but are not limited to, nickel, platinum, palladium, ruthenium, molybdenum, tungsten, and rhodium. Generally, catalytically active metals are chosen from Group VIB and/or Group VIII of the periodic table.

The magnesium aluminosilicate clay can be in an acidic form or in a nonacidic form depending on the desired application for the hydroprocessing catalyst. In hydroprocessing reactions such as hydroisomerization and hydrogenation, the magnesium aluminosilicate product can be catalytically inactive and function as a support to disperse the catalytically active metals. When used as a component in a hydrocracking catalyst, the magnesium aluminosilicate clay is preferably in an acidic form. When the magnesium aluminosilicate clay is in an acidic form, the magnesium aluminosilicate can crack the hydrocarbon feedstock, contributing to the overall catalytic activity of the catalyst composition.

An example of a catalyst according to the invention which is suitable for the production of diesel by way of hydrocracking comprises the magnesium aluminosilicate clay of the present invention in combination with one or more zeolites, inorganic oxides, and Group VIB and/or Group VIII metal component.

Zeolites can be broadly described as crystalline microporous molecular sieves that possess three-dimensional frameworks composed of tetrahedral units ($TO_{4/2}$, T=Si, Al, or other tetrahedrally coordinated atom) linked through oxygen atoms. Zeolite X (FAU) and zeolite Beta are examples of zeolites with large pores delimited by 12-membered rings wherein the pore aperture measures about 7.4 Å. The pores in zeolites are often classified as small (8 T atoms), medium (10 T atoms), large (12 T atoms), or extra-large ($\geqq 14$ T atoms) according to the number of tetrahedral atoms that surround the pore apertures. The classification of intrazeolite channels as 1-, 2-, or 3-dimensional is set forth by R. M. Barrer in Zeolites, Science and Technology, edited by F. R. Rodrigues, L. D. Rollman and C. Naccache, NATO ASI Series, 1984 which classification is incorporated in its entirety by reference (see particularly page 75).

Other examples of large pore zeolites include, but are not limited to, zeolite Y, FAU, EMT, ITQ-21, ERT, and ITQ-33. These are documented at http://topaz.ethz.ch/IZA-SC/StdAtlas.htm, and in Baerlocher, Meier, and Olson's "Atlas of Zeolite Framework Types", Elsevier, 2001.

In one embodiment, the catalyst composition of the present invention comprises a large pore zeolite which has a Si:Al ratio in the range from about 10:1 to about 100:1, preferably in the range from about 10:1 to about 60:1. In a preferred embodiment the zeolite is a faujasite. The catalyst composition of the instant invention comprises active zeolite components ranging from about 1% to about 50% of the catalyst composition.

Inorganic oxides such as silica, alumina, magnesia, titania, zirconia, and combinations thereof can be components of the hydroprocessing catalyst. The inorganic oxide can contribute to the overall catalytic activity of the catalyst composition through contribution of acid sites or the inorganic oxide can act as a diluent or binder. The inorganic oxide can function as filler material, acting as diluent of the cracking activity of the clay platelets, for example, thus making it possible to regulate the cracking activity of the catalyst. The inorganic oxide can provide a matrix for one or more catalytically active components, without providing catalytic activity itself, but improving the attrition resistance of the catalyst composition. The amount of inorganic oxide to be added to the hydroprocessing catalysts of the invention generally depends on the desired activity of the final catalyst composition and can range from 0% to about 95%. The inorganic oxide can provide increased surface area for the catalytically active components of the catalyst composition. In one embodiment, the inorganic oxide can be a mesoporous inorganic oxide with an average pore size from about 2 to 50 nm as measured by nitrogen adsorption/desorption. Preferably the average pore size of the inorganic oxide is between about 7.5 to 12 nm.

In an embodiment, the catalyst composition of this invention further comprises a hydrogenation component which is selected from a Group VIB metal, a Group VIII metal, and combinations thereof. As will be evident to the skilled person, the word "component" in this context denotes the metallic form of the metal, its oxide form, or its sulphide form, or any intermediate, depending on the situation. The hydrogenation metals are selected from the Periodic Table's Group VIB and Group VIII metals (CAS Periodic Table). The nature of the hydrogenation metal present in the catalyst is dependent on the catalyst's envisaged application. If, for example, the catalyst is to be used for hydrogenating aromatics in hydrocarbon feeds, the hydrogenation metal used preferably will be one or more noble metals of Group VIII, preferably platinum, palladium, or combinations thereof. In this case the Group VIII noble metal preferably is present in an amount of 0.05-5 wt. %, more preferably in an amount of 0.1 to 2 wt. %, and most preferably in an amount of 0.2 to 1 wt. %, calculated as metal. If the catalyst is to be used for removing sulphur and/or nitrogen, it will generally contain a Group VIB metal component and/or a non-noble Group VIII metal component. In an embodiment, the hydrogenation metal is molybdenum, tungsten, nickel, cobalt, or a mixture thereof. The Group VIB and/or non-noble Group VIII hydrogenation metal preferably is present in an amount of 2 to 50 wt. %, more preferably in an amount of 5 to 30 wt. %, most preferably in an amount of 5 to 25 wt. %, calculated as the metal oxide.

If the catalyst is to be used in hydrocracking or mild hydrocracking, a Group VIII noble metal or a combination of a Group VIB metal and a Group VIII non noble metal can be used. In one embodiment, the hydrocracking catalyst of the present invention comprises nickel, tungsten, molybdenum, or combinations thereof.

The magnesium aluminosilicate clay of the present invention enables the hydrogenation metals, as described above, to be incorporated, at least in part, into the magnesium aluminosilicate platelet structure. For instance, cobalt or nickel may be present in the octahedral layer. In order to be catalytically active, these metals must be removed from the clay platelet structure during catalyst use. This can be done, for example, by means of reduction or sulphidation, for instance when the catalyst is sulphided under reducing conditions prior to use. Alternatively, the hydrogenation metals can be incorporated into the interlayer between the clay platelets through ion exchange. Regardless of the incorporation site, the magnesium aluminosilicate clay of the present invention helps to disperse the catalytically active metal.

Various methods of adding active metals to catalyst compositions are known in the art. Briefly, methods of incorporating active metals include ion exchange, homogeneous deposition precipitation, redox chemistry, chemical vapor deposition, and impregnation. Preferably, impregnation is used to incorporate active metals into the catalyst composition. Impregnation involves exposing the catalyst composition to a solution of the metal or metals to be incorporated followed by evaporation of the solvent. In an embodiment, chelating agents are used during metal impregnation. "Chelating agents" or "chelates" can be described as a molecule containing one or more atoms capable of bonding to, or complexing with, a metal ion. The chelating agent acts as a ligand to the Group VIB and/or Group VIII metal ions, often through electron pair donor atoms in the chelating agent. Chelated metal ions tend to be more soluble and chelating agents can improve the dispersion of metal ions throughout the catalyst composition. Chelates can be polydentate, in that they can bond or complex to a metal ion through one or more positions. For example a bidentate ligand forms two bonds with a metal ion, whereas a hexadentate ligand forms six bonds with a metal ion. Examples of chelating agents include, but are not limited to, citrate, ethylene diamine tetraacetic acid (EDTA), ethylene glycol tetraacetic acid (EGTA), nitrilotriacetic acid (NTA), halides, nitrate, sulfate, acetate, salicylate, oxalate, and formate. Other examples of chelates include, but are not limited to, carboxylic acid such as glycolic acid, lactic acid, tartaric acid, malic acid, maleic acid, citric acid, glyceric acid, gluconic acid, methoxy-acetic acid, ethoxy-acetic acid, malonic acid, succinic acid and glyoxylic acid and organic sulfur compounds such as mercapto-acetic acid, 1-mercapto-propionic acid, 2-mercaptopropionic acid, 2,3-dimercapto-succinic acid, mercaptosuccinic acid, thioacetic acid, thio-diglycolic acid, dithio-diglycolic acid, thiosalicylic acid, mercaptoethanol, β-thiodiglycol and thiourea. Other oxygen containing compounds in addition to carboxylic acids can also be used as chelating agents. Examples include, but are not limited to, ethylene glycol, propylene glycol, diethylene glycol, trimethyleneglycol, triethyleneglycol, ethyleneglycol monobutyl ether, diethylene glycol monomethyl ether, diethylene glycol monomethylether, diethylene glycol monopropyl ether, diethylene glycol monobutyl ether, glycerine, trimethylol ethane, and trimethyl propane. In an embodiment, nickel citrate solutions are used to impregnate the catalyst composition. Other examples of metal ion-chelate complexes which can be used to impregnate a catalyst or catalyst composition with metals or metal ions include nickel-EDTA, nickel-acetate, nickel-formate, molybdenum-citrate, nickel-NTA, and molybdenum-NTA. For a review see A. Jos van Dillen, R. J. A. M. Terörde, D. J. Lensveld, J. W. Geus, and K. P. de Jong, "Synthesis of supported catalysts by impregnantion and drying using aqueous chelated metal complexes", Journal of Catalysis, 2003, p. 257-264, herein incorporated by reference in its entirety.

The Group VIB and/or Group VIII metals can be added to the magnesium aluminosilicate clay prior to, during, or after formation of the multi-component catalyst composition. For example, after the magnesium aluminosilicate clay is collected, the magnesium aluminosilicate clay can be (1) dried, impregnated with active metal(s), extruded, and calcined, or (2) impregnated with active metal(s), extruded, and calcined, or (3) dried, extruded, impregnated with active metal(s), and calcined. The magnesium aluminosilicate clay can be mixed with one or more components such as zeolites, crystalline cracking components, non-crystalline cracking components, catalytically inactive binders, diluents, and combinations thereof prior to or after impregnation with the Group VIB and/or Group VIII metals.

The order of addition of catalyst components to the final catalyst composition can vary. Catalysts comprising the magnesium aluminosilicate clay of the invention can be prepared in any way known in the art. For instance, the magnesium aluminosilicate clay described above can be extruded into particles, the particles calcined, and then the calcined particles impregnated with an impregnating solution containing salts of the hydrogenation metals to be introduced, optionally in combination with other components such as phosphoric acid, and/or complexing agents. Alternatively, the magnesium aluminosilicate described above can be mixed with other support materials such as amorphous alumina, silica alumina, and the like which may have their own catalytic activity, whereupon this mixture can be extruded and the resulting extrudates calcined. The calcined extrudates can then be impregnated as described above. It is also possible to add certain hydrogenation metal components to the catalyst composition prior to extrusion, more particularly, it is proposed to mix the magnesium aluminosilicate described above and any other support materials with molybdenum oxide, after which the resulting mixture is extruded and calcined.

If the catalyst contains non-noble Group VIII metals and/or Group VIB metals as hydrogenation metals, it is preferably sulfided prior to use. This involves converting the metal components in the catalyst to their sulfided form. The sulfiding can be done by means of processes known to the skilled person, for example, by contacting the catalyst in the reactor at rising temperature with hydrogen and a sulfurous feed, or with a mixture of hydrogen and hydrogen sulfide. If the catalyst contains a Group VIII noble metal, there is no need for sulfiding as a rule, and a reducing step, for example, with hydrogen, will suffice.

Generally, the magnesium aluminosilicate clay of the present invention can comprise from about 1% to about 99.9% of the hydroprocessing catalyst. For example, catalysts are envisaged containing 1-99.9 wt. % of magnesium aluminosilicate clay of the present invention, 0-25 wt. % of a zeolite component, 0.1-35 wt. % of a hydrogenation metal component, 0-97.9 wt. % of mesoporous alumina, and the balance inorganic oxide matrix material. Suitable inorganic oxide matrix materials are, for example, alumina, silica, titania, zirconia, and combinations thereof. In one embodiment the inorganic oxide matrix material is alumina. In one embodiment, the hydrocracking catalyst of the present invention comprises 0.1 wt. % platinum, palladium, or combinations thereof and 99.9% magnesium aluminosilicate clay of the present invention.

In another embodiment, the hydrocracking catalyst of the present invention comprises (1) 20 to 30 wt. % Group VIB metal, non-noble Group VIII metal, or combinations thereof, (2) 0.5 to 60 wt. % zeolite Y, and (3) 10 to 79.5 wt. % magnesium aluminosilicate clay, wherein the magnesium aluminosilicate clay is synthesized according to the synthesis process of the present invention.

Optionally, the catalyst can further contain other components such as phosphorus. It will be obvious to the skilled person that phosphorus can be incorporated into the catalyst in a suitable manner by contacting the catalyst during any one of its formative stages with an appropriate quantity of a phosphorus-containing compound, e.g., phosphoric acid. For instance, the catalyst can be impregnated with an impregnating solution comprising phosphorus in addition to any other components. If the catalyst according to the invention contains phosphorus, this compound is preferably present in an amount of 0.5-10 wt. %, calculated as $P_2O_5$, based on the weight of the catalyst composition.

The catalyst compositions described above can be in the form of particles of many different shapes. The suitable shapes include spheres, cylinders, rings, and symmetric or asymmetric polylobes, for instance tri- and quadrulobes. The particles usually have a diameter in the range of 0.5 to 10 mm, and their length likewise is in the range of 0.5 to 10 mm.

Catalysts comprising the magnesium aluminosilicate of the invention can be used with a wide variety of hydrocarbonaceous feedstocks. Examples of hydrocarbonaceous feedstocks include, but are not limited to, petroleum distillates, heavy straight-run gas oils, heavy cracked cycle oils, conventional FCC feeds and portions thereof, Fischer-Tropsch derived feedstocks, solvent-deasphalted petroleum residua, shale oils, coal tar distillates, and hydrocarbon feedstocks derived from plant, animal, and/or algal sources. Feedstocks can be obtained from thermal or catalytic cracking of various stocks, including those obtained from petroleum, gilsonite, shale and coal tar. The feedstocks can be subjected to a hydrofining treatment, a hydrogenation treatment, a hydrocracking treatment, or combinations thereof, prior to contact with the catalyst of the invention. Generally, if the hydroprocessing reaction is hydrocracking and/or dewaxing the feedstocks will contain hydrocarbons boiling above 350° F. and straight chain and slightly branched chain hydrocarbons. The feedstocks can contain substantial amounts of materials boiling above 200° F. The feedstocks can contain substantial amounts of materials boiling in the range 350° F. to 900° F., and even substantial amounts of materials boiling in the range 400° F. to 950° F. Organic nitrogen content of the feedstock is generally less than 1000 parts per million (ppm), preferably 0.5 to 500 parts per million, and more preferably, 0.5 to 100 parts per million. When contacting the catalyst of this invention, it is preferable to maintain the organic sulfur content of the feedstock in a range of from about 0 to 3 weight percent, preferably from 0 to 1 weight percent.

Catalysts comprising the magnesium aluminosilicate clay may be used in a variety of hydroprocessing processes such as hydrocracking, hydroisomerization, reforming, hydrotreating and the like. In an embodiment, the invention is directed to hydroprocessing processes comprising the step of contacting a hydrocarbonaceous feedstock with a catalyst composition comprising a magnesium aluminosilicate clay wherein the magnesium aluminosilicate clay has a silicon to aluminum elemental mole ratio greater than 3 and wherein the $^{29}$Si NMR of the magnesium aluminosilicate clay comprises peaks as given in Table 1.

Depending on their composition, the catalysts according to the invention can be used in virtually all hydroprocessing processes to treat a plurality of feeds under wide-ranging reaction conditions. For example, reaction conditions can include temperatures in the range of 200° to 440° C., hydrogen pressures in the range of 5 to 300 bar, and liquid hourly space velocities (LHSV) in the range of 0.05 to 10 h$^{-1}$. In particular, certain catalysts according to the invention are suitable for use in the hydrocracking of heavy feedstocks to form middle distillates. For these hydrocracking processes the temperature is in a range of about 2000 to about 450° C., the hydrogen pressure is in a range of about 25 to about 250 bar, and the liquid hourly space velocity is in a range of about 0.2 to 3 hours$^{-1}$;

Generally, the conditions selected are such as will give a conversion of at least 20 wt %, By "conversion" it is meant that the feedstock is chemically changed to produce a new substance. Examples of conversion include cracking of higher molecular weight hydrocarbons to give lower molecular weight hydrocarbons, isomerization of n-paraffins to iso-paraffins, and hydrogenation.

An example of a catalyst according to the invention which is suitable for use in mild hydrocracking to produce middle distillates is a catalyst comprising 3-40 wt % of hydrogenation metal components, which preferably are nickel, molybdenum, tungsten, or combinations thereof, 5-75 wt % of the magnesium aluminosilicate clay of the present invention, and 0-92 wt % of alumina binder.

The catalysts according to the present invention can also be used in hydroisomerization of long chain n-paraffins. By "long chain n-paraffins" it is meant aliphatic hydrocarbons having at least about 20 carbon atoms. These long chain paraffins, also known as waxes, are molecules that have a negative effect on the quality of diesel fuels and lube oils, particularly the pour point and/or cloud point. For example, wax molecules tend to crystallize at unacceptably high temperatures, so rendering a diesel unsuitable for fuel applications during wintertime. In lube oils, waxes will affect the viscosity. Generally, wax molecules can be removed by chemically changing their structure through (hydro)isomerization and/or (hydro)cracking. A (hydro)cracking catalyst will convert some of the feedstock, namely the n-paraffins, to lighter products. These lighter products can be outside the desired boiling range, thus negatively impacting the yields of middle distillate. A (hydro)isomerization process, on the other hand, will convert the n-paraffins to isoparaffins, which have boiling points in the desired range but melting/crystallization points much lower than those of the n-paraffins.

While not being bound by any theory, we believe that catalyst compositions as described above are particularly suited for hydroprocessing reactions such as the hydrocracking of high molecular weight hydrocarbons because of the large surface area, pore structure, and high density of acid sites of the magnesium aluminosilicate clay of the invention used as a component of the catalyst compositions. Relatively large size organic molecules, such as high molecular weight hydrocarbons (hydrocarbons having greater than 20 carbon atoms) and aromatic compounds, can penetrate the mesopores of the magnesium aluminosilicate clay or react with acid sites on the surface of the magnesium aluminosilicate clay. The magnesium aluminosilicate clay, with its extensive surface area, helps disperse active Group VIB and/or Group VIII metals, providing more discreet sites for hydrogenation reactions to occur. Furthermore, the magnesium aluminosilicate clays synthesized according to the process of the present invention exhibit higher activity than magnesium aluminosilicate clays synthesized by prior art methods, likely due to increased incorporation of $Al^{3+}$ into the tetrahedral sheets, leading to higher acid site density and a more active catalyst composition.

Applications other than as a catalyst or catalyst component in hydroprocessing reactions can be envisaged for the magnesium aluminosilicates of the present invention. Because the magnesium aluminosilicates of the present invention are clays, they will have absorptive properties and ion exchange properties. They can be used in many of the same applications clays are currently used for. For example, clays are used to absorb excess oil, moisture, dirt, odors, and other molecules from the skin and thus have applications in cosmetics and personal care items. Some clays, such as bentonite, are primarily ingested for medicinal purposes such as detoxification or mineral deficiencies. Uses such as these can be envisaged for the magnesium aluminosilicate clays of the present invention. By adding or altering the metal content of the magnesium aluminosilicate clays of the present invention by, for example, adding colored metal salts during or after synthesis, the color of the magnesium aluminosilicate clay can be modified. Colored clays have applications in cosmetics and powders.

EXAMPLES

Example 1 (Comparative)

A magnesium aluminosilicate with an elemental composition Mg 5.7 [Si 6.4 Al 1.6]O 20 (OH)4 with a Si/Al=4 was prepared as follows. Water glass (sodium silicate) (27 wt. % $SiO_2$) was mixed with aluminum nitrate at room temperature to form a silica-alumina gel. The mixture was then filtered and added to a solution of magnesium nitrate and the pH adjusted with NaOH to about 8.8. The reaction was allowed to proceed for 40 hours at 90° C. after which time the reaction mixture was filtered and washed. The filtrate was a magnesium aluminosilicate clay.

Example 2

A magnesium aluminosilicate clay with an elemental composition Mg 5.4 [Si 6.6 Al 1.4]O 20 (OH)$_4$ with a Si/Al=4.7 was prepared as follows. Water glass (27 wt. % $SiO_2$) was mixed with aluminum nitrate at room temperature and the pH adjusted to about 1 with nitric acid. A solution of magnesium nitrate was added to form a first reaction mixture. The pH of the first reaction mixture was then adjusted to about 8.4 with the addition of NaOH to form a second reaction mixture. The reaction was allowed to proceed for 1 hour at 50° C. after which time the second reaction mixture was filtered and washed. The filtrate was the magnesium aluminosilicate clay of the invention.

Example 3 (Comparative)

The magnesium aluminosilicate clay of Example 1 was added to a 0.1 M solution of ammonium nitrate to exchange the sodium cations for ammonium cations. The ammonium substituted magnesium aluminosilicate clay was collected by filtration and washed with water. The ammonium substituted magnesium aluminosilicate clay was then calcined at 450° C. degrees for 12 hours to convert the magnesium aluminosilicate clay to the protonated form.

Example 4

The magnesium aluminosilicate clay of Example 2 was added to a 0.1 M solution of ammonium nitrate to exchange the sodium cations for ammonium cations. The ammonium substituted magnesium aluminosilicate clay was collected by filtration and washed with water. The ammonium substituted magnesium aluminosilicate clay was then calcined at 450° C. degrees for 12 hours to convert the magnesium aluminosilicate clay to the protonated form.

Example 5

The magnesium aluminosilicate clay of example 4 was characterized by nitrogen adsorption/desorption. The surface area of the magnesium aluminosilicate was approximately 550 $m^2$/g and the pore volume was approximately 0.9 cc/g. Mesoporosity of the material was confirmed by nitrogen adsorption/desorption hysteresis which was indicative of a mesoporous material.

Example 6

The magnesium aluminosilicate clay of Example 4 was characterized by transmission electron microscopy (TEM). Clay platelets were approximately 5 nm to 50 nm.

Example 7

The magnesium aluminosilicate of Example 4 was characterized by $^{29}$Si NMR. The magnesium aluminosilicate of Example 4 was hydrated in a dessicator filled with 1.0 M KCl. The sample was spun at 8 kHz with 500 scans collected and a relaxation time of 100 seconds between scans. Results are given in Table 2.

TABLE 2

| Peaks | Chemical shift (ppm) | Line width (Hz) | Integrated Area | Assignment |
|---|---|---|---|---|
| P1 | −79.76 | 596 | 23320.66 | $Si(OAl)_3$ |
| P2 | −81.4 | 199 | 3525.64 | $Si(OSi)_1(OAl)_2$ |
| P3 | −85.146 | 348 | 31658.49 | $Si(OSi)_1(OAl)_2$ |
| P4 | −88.727 | 149 | 2855.67 | $Si(OSi)_2(OAl)_1$ |
| P5 | −92.30 | 631 | 94185.73 | $Si(OSi)_3$ |

Example 8 (Comparative)

The magnesium aluminosilicate clay of Comparative Example 3 (44.8 wt. %) was mixed with faujasite (5.5 wt. %), boehmite (16.2 wt. %), and mesoporous alumina (33.4 wt. %) under aqueous conditions in the presence of dilute nitric acid to form a slurry. Water soluble methylcellulose derived polymer (Methocel, Dow Corp.) was added to achieve an extrudable mixture (less than 1 wt. % methylcellulose derived polymer added). The mixture was extruded, dried at 250° F., and calcined at 1100° F. for one hour to form a calcined extrudate. The calcined extrudate was then mixed with a solution of nickel and tungsten salts in the presence of citrate. The mixture was allowed to soak for 1 hr., then dried at 212° F. for 2 hours. The metal content of the final catalyst was approximately 5 wt. % NiO and approximately 25 wt. % $WO_3$.

Example 9

The magnesium aluminosilicate of the invention, Example 4, (44.8 wt. %) was mixed with faujasite (5.5 wt. %), boehmite (16.2 wt. %), and mesoporous alumina (33.4 wt. %) under aqueous conditions in the presence of dilute nitric acid to form a slurry. Water soluble methylcellulose derived polymer (Methocel Dow Corp.) was added to achieve an extrudable mixture (less than 1 wt. % methocel added). The mixture was extruded, dried at 250° F., and calcined at 1100° F. for one hour to form a calcined extrudate. The calcined extrudate was then mixed with a solution of nickel and tungsten salts in the presence of citrate. The mixture was allowed to soak for 1 hr., then dried at 212° F. for 2 hours. The metal content of the final catalyst was approximately 5 wt. % NiO and approximately 25 wt. % $WO_3$.

Example 9

The catalysts of Example 7 (comparative) and Example 8 (invention) were compared for hydrocracking activity on a feedstock with the characteristics given in Table 3.

TABLE 3

|  | Feedstock |
|---|---|
| Nitrogen (ppm) | 1152 |
| Sulfur (wt. %) | 2.70 |
| wax (wt. %) | 11.1 |
| VI | 72 |
| vis 100° C. | 9.645 |
| API | 19.8 |
| IBP[1] | 638 |
| 5% | 694 |
| 10% | 734 |
| 20% | 770 |
| 30% | 805 |
| 40% | 836 |
| 50% | 866 |
| 60% | 894 |
| 70% | 923 |
| 80% | 956 |
| 90% | 991 |
| 95% | 1013 |
| end | 1055 |

[1]Initial Boiling Point

For a 60% conversion of the feedstock, reaction conditions included a temperature of 745° F., a pressure of 2300 psig, a molar ratio of hydrogen to hydrocarbon of 5000 scfb and a feed rate of 0.75 hr$^{-1}$ LHSV. Results of the hydrocracking reaction are given in Table 4.

TABLE 4

|  | Example 7 (comparative) | Example 8 (invention) |
|---|---|---|
| T req 60% (° F.) | 745 | 745 |
| C4- | 2.1 | 2.1 |
| C5-180° F. | 3.1 | 2.5 |
| 180-250° F. | 5.1 | 4.7 |
| 250-550° F. | 34.0 | 34.0 |
| 550-700° F. | 17.4 | 18.5 |
| 700-800° F. | 15.3 | 15.2 |
| 800-900° F. | 12.7 | 12.8 |
| 900° F.+ | 9.6 | 9.6 |
| W viscosity 100° C. (cSt) | 5.04 | 4.94 |
| Waxy VI 700° F.+ | 146 | 150 |
| DWO (dewaxed oil) viscosity 100° C. (cSt) | 5.07 | 4.92 |
| DWO (dewaxed oil) VI (Viscosity Index) 700° F.+ | 132 | 132 |

Table 4 demonstrates that the catalyst comprising the magnesium aluminosilicate of the invention has improved yield of middle distillate in fuels hydroprocessing applications as compared to a catalyst comprising a magnesium aluminosilicate synthesized by prior art methods. The temperature required for 60% conversion is the same for catalysts comprising 1) the magnesium aluminosilicate clay of the invention and 2) a magnesium aluminosilicate synthesized by prior art methods. However, the yield in the middle distillate range (550-700° F.) is higher for the catalyst comprising the magnesium aluminosilicate clay of the invention.

The invention claimed is:

1. A process for preparing a magnesium aluminosilicate clay comprising the following steps:
    a) combining (1) a silicon component (2) an aluminum component, and (3) a magnesium component, under aqueous conditions at a first reaction temperature and at ambient pressure, to form a first reaction mixture, wherein the pH of said first reaction mixture is acidic and a silica-alumina gel is not formed prior to the addition of the magnesium component;
    b) adding an alkali base to the first reaction mixture to form a second reaction mixture having a pH greater than the pH of the first reaction mixture; and
    c) reacting the second reaction mixture at a second reaction temperature and for a time sufficient to form a product comprising a magnesium aluminosilicate clay.

2. The process of claim 1 wherein the pH of the first reaction mixture is in the range of between about 0 to about 5.

3. The process of claim 1, wherein the pH of the second reaction mixture is greater than 7.5.

4. The process of claim 1, wherein the magnesium aluminosilicate clay is mesoporous.

5. The process of claim 1, wherein the magnesium aluminosilicate clay product is trioctahedral.

6. The process of claim 1, wherein the first reaction temperature is between the freezing point and the boiling point of the first reaction mixture.

7. The process of claim 6, wherein the first reaction temperature is between about 50° C. and 80° C.

8. The process of claim 1, wherein the second reaction temperature is between the freezing point and the boiling point of the second reaction mixture.

9. The process of claim 8, wherein the second reaction temperature is between about 50° C. and 80° C.

10. The process of claim 1, wherein the silicon component is selected from the group consisting of sodium silicate, potassium silicate, silica gels, silica sols, and combinations thereof.

11. The process of claim 1, wherein the aluminum component is selected from the group consisting of alumina, aluminum nitrate, alkali metal salts of aluminum, and combinations thereof.

12. The process of claim 1, wherein the magnesium component is selected from the group consisting of magnesium nitrate, magnesium sulfate, magnesium halide salts, and combinations thereof.

13. The process of claim 1, wherein the alkali base is selected from the group consisting of sodium hydroxide, potassium hydroxide, and combinations thereof.

14. The process of claim 1, further comprising ion exchanging the magnesium aluminosilicate clay with an ammonium salt to form an ammonium-substituted magnesium aluminosilicate clay.

15. The process of claim 14, wherein the ammonium salt comprises ammonium nitrate.

16. The process of claim 14, further comprising calcining the ammonium-substituted magnesium aluminosilicate clay.

17. The process of claim 1, wherein the magnesium aluminosilicate clay has an average surface area of from 100 $m^2/g$ to 1000 $m^2/g$.

18. The process of claim 17, wherein the magnesium aluminosilicate clay has an average surface area of from 400 to 900 $m^2/g$.

19. The process of claim 1, wherein the magnesium aluminosilicate clay product has an average pore volume of greater than 0.4 cc/g.

20. The process of claim 19, wherein the magnesium aluminosilicate clay product has an average pore volume of greater than 0.6 cc/g.

21. The process of claim 20, wherein the magnesium aluminosilicate clay product has an average pore volume of greater than 1.0 cc/g.

22. The process of claim 1, wherein the first reaction mixture comprises, in terms of elemental mole ratios, aSi:bAl:cMg, wherein "a" has a value from 6 to 8, "b" has a value from 0.001 to 7.9, and "c" has a value of from 0.1 to 6, wherein b=(6−c)+(8−a), and wherein a:b is at least 3.

23. The process of claim 1, wherein the magnesium aluminosilicate clay comprises, in terms of elemental mole ratios, dSi:eAl:fMg, wherein "d" has a value from 6 to 8, "e" has a value from 0.001 to 7.9, and "f" has a value of from 0.1 to 6, wherein e=(6−f)+(8−d), and wherein d:e is at least 3.

24. The process of claim 1, wherein the magnesium aluminosilicate clay comprises clay platelets from about 5 nm to about 50 nm in the longest dimension.

25. The product formed by the process of claim 1, 14, or 16.

26. A magnesium aluminosilicate clay wherein the magnesium aluminosilicate clay has a silicon to aluminum elemental mole ratio greater than 3 and wherein the $^{29}$Si NMR of the magnesium aluminosilicate clay comprises peaks as given in Table 1.

27. The magnesium aluminosilicate clay of claim 26, wherein said clay is mesoporous.

28. The magnesium aluminosilicate clay of claim 26, wherein said clay comprises clay platelets from about 5 nm to about 50 nm in diameter.

29. A catalyst composition comprising a magnesium aluminosilicate clay wherein the magnesium aluminosilicate clay is synthesized according to a method comprising the following steps:
   a) combining (1) a silicon component (2) an aluminum component, and (3) a magnesium component, under aqueous conditions at a first reaction temperature and at ambient pressure, to form a first reaction mixture, wherein the pH of said first reaction mixture is acidic and a silica-alumina gel is not formed prior to the addition of the magnesium component;
   b) adding an alkali base to the first reaction mixture to form a second reaction mixture having a pH greater than the pH of the first reaction mixture; and
   c) reacting the second reaction mixture at a second reaction temperature and for a time sufficient to form a product comprising a magnesium aluminosilicate clay.

* * * * *